(12) United States Patent
Dutto et al.

(10) Patent No.: US 6,359,240 B1
(45) Date of Patent: Mar. 19, 2002

(54) CONTAINER CAPACITY CONTROL SYSTEM

(75) Inventors: Ivo Dutto; Alfonso Arechaga; Antonio Aragon; Francisco José Colomino, all of Llodio (ES)

(73) Assignees: Vidrala, S.A.; Avacon, S.A., both of (ES)

( * ) Notice: Subject to any disclaimer, the term of this patent is extended or adjusted under 35 U.S.C. 154(b) by 0 days.

(21) Appl. No.: 09/562,838

(22) Filed: May 1, 2000

(51) Int. Cl.[7] .................. G01G 13/00; G01G 19/00; B65B 1/32
(52) U.S. Cl. ............... 177/52; 177/60; 177/145; 141/83
(58) Field of Search .................. 141/83; 177/145, 177/25.11, 25.12, 25.13, 25.19, 52, 60, 63, 64, 119, 120

(56) References Cited

U.S. PATENT DOCUMENTS

| | | | | |
|---|---|---|---|---|
| 4,211,263 A | * | 7/1980 | Kennedy et al. | 141/83 |
| 4,337,802 A | * | 7/1982 | Kennedy et al. | 141/83 |
| 4,605,047 A | * | 8/1986 | Bausch et al. | 141/83 |
| 4,630,654 A | * | 12/1986 | Kennedy, Jr. | 141/83 |
| 5,004,093 A | * | 4/1991 | Blezard | 177/52 |
| 5,092,414 A | * | 3/1992 | Blezard | 177/52 |
| 6,053,219 A | * | 4/2000 | Seiver | 141/83 |
| 6,073,667 A | * | 6/2000 | Graffin | 141/83 |
| 6,096,983 A | * | 8/2000 | Ozaki et al. | 177/52 |

* cited by examiner

Primary Examiner—Randy W. Gibson
(74) Attorney, Agent, or Firm—Bierman, Muserlian and Lucas

(57) ABSTRACT

Container capacity control system, which is comprised of a first horizontal linear guide (3) where there is a clamp head (13), which can move horizontally and rotate on the horizontal plane and which holds a first clamp (1) and a second clamp (2) for the input and output of an empty container (b1) respectively; a second horizontal linear guide (4) where means for the total filling or predetermined partial filling move; some weighing scales (5), which weigh the container (b1) empty and totally full or partially full with the predetermined amount, sending the weight data to a microprocessor, which controls the programmed system, so that it distinguishes between full-to-the-brim containers and containers partially filled, calculating the capacity based on the weighing data.

7 Claims, 4 Drawing Sheets

CONTAINER CAPACITY CONTROL SYSTEM

For different reasons, containers, and among these, glass bottles, undergo variations in capacity for the same type of container and user.

If the product to be placed in the container costs a lot per cubic centimetre, for example a liqueur, top quality cognac, increases in capacity with respect to the theoretically established amount may represent great losses for the relative brand.

Therefore, it is necessary for the capacity of the containers not to undergo variations, and if they do so, this must be detected quickly and economically.

Having described the problem, the requesting party knows no system, process or machine that does this, and therefore has developed the container capacity control system, which is the object of this invention.

The system is based on the control of the container capacity comprising:

a) a first horizontal linear guide where a clamp head is placed, which can move horizontally and rotates on the horizontal plane. This clamp head has a first clamp and a second clamp for the input and output of an empty container, respectively;

b) a second horizontal linear guide where a filling head is placed, which can at least be moved horizontally, this second guide bears means for the total filling or filling with a predetermined partial amount;

c) weighing scales that weigh the container both empty and totally full or filled with a predetermined partial amount, sending the weight data to d) a microprocessor that controls the programmed system so that it distinguishes full containers and partially full containers, and calculates the capacity based on the weight data.

It is also characterised because the filling means are comprised of a total liquid filling unit and a liquid levelling unit.

It is also characterised because the liquid filling unit has a probe, which moves vertically, and the levelling unit has a suction cane, which moves vertically due to the action of the precision motor.

It is also characterised because geometrically, on the circumference of the rotation radius of the first clamp, there is a weighing position and a filling position, the centre of rotation being at the bisector of the first and second clamps, which are joined together.

With the weight data, the microprocessor, based on traditional statistical programs/algorithms, decides if there are or not errors to be corrected.

In order to have a better understanding of the object of this invention, a preferential practical execution method is shown on the drawings, which is subject to accessory changes that take nothing away from its basics.

Figure 1:
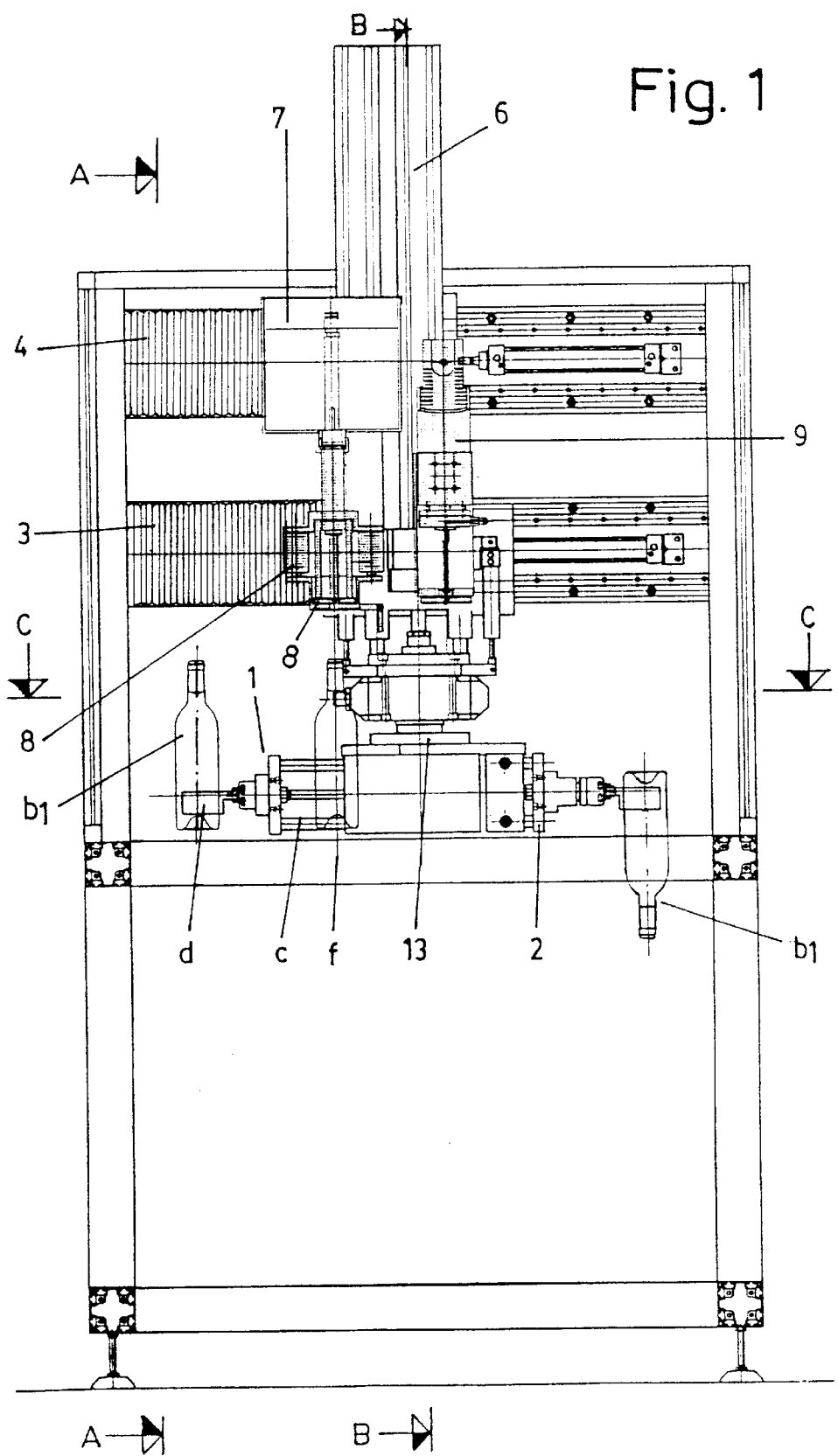
FIG. 1 is an elevational view of a practical execution of the system targeted by the invention, but showing on the left the first clamp (1) picking the bottle (b1) up and on the right the second clamp (2) turning the bottle (b1) over.

Below a practical execution of this invention is described, but it is not limiting.

The bottles (b1) advance along the input conveyor line (t1). This conveyor line (t1) may be the one corresponding to the laboratory, to a collateral line, the actual production line, etc.

The machine is comprised of a first horizontal linear guide (3) where there is a clamp head (13), with the possibility of movement. This is comprised of a first clamp (1) for the input conveyor line (t1) and a second clamp (2) for the output conveyor line (t2), it being preferable for both clamps (1), (2) to be joined together, being at 90° in the drawings (FIG. 4).

The machine also has a second horizontal linear guide (4) where there is a vertical guide, which can move vertically on this second guide (4), which acts as filling head (6) and which bears a liquid filling unit (7) and a liquid levelling unit (9).

Figure 4:
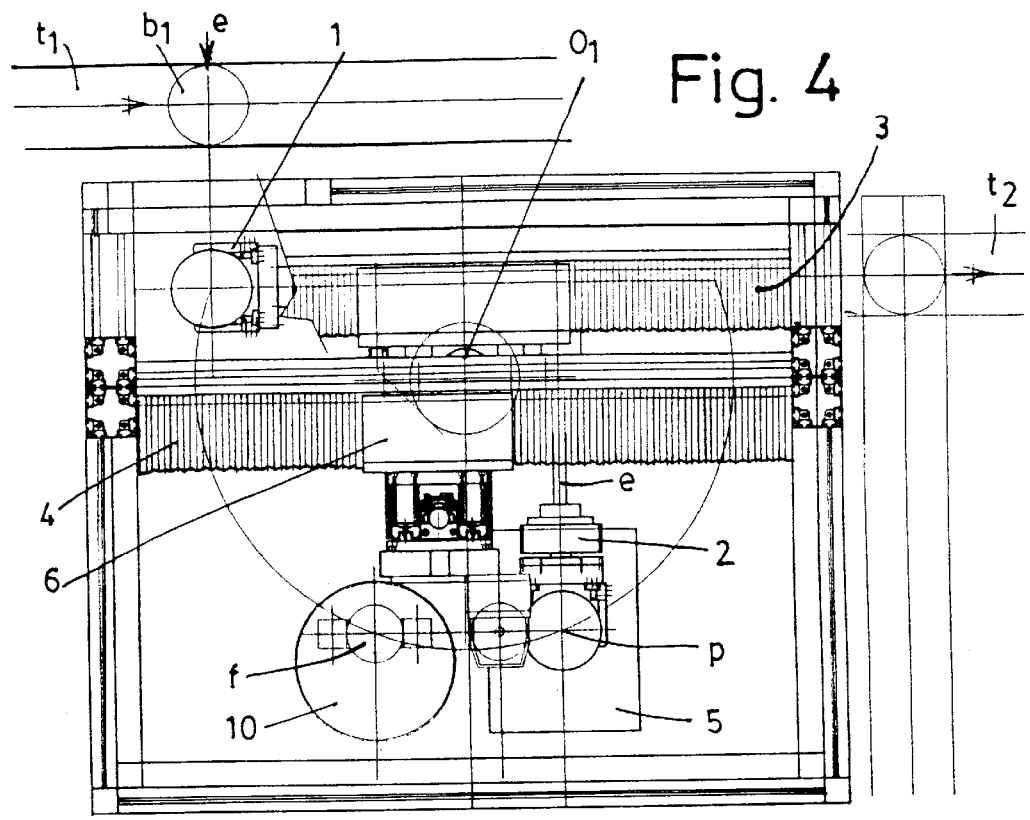
FIG. 4 is a ground view of FIG. 1 showing the geometrical layout of the elements.

The bottle (b1) to be controlled passes from the input conveyor line (t1) to the machine due to the action, for example of a thruster (3) or by any other traditional means (FIG. 4).

It operates as follows:

The centre of rotation (01) of the head (13) of the clamps is situated at the bisector of the initial positions (P1) (P3) of the first clamp (1) and of the second clamp (2) respectively.

The first clamp (1) picks up the bottle (b1) and take it to a position (P2) perpendicular to the initial position (P1), then the head (13) moves taking the first clamp (1) to position (P3) on some scales (5) on the weighing point (p) where the bottle (b 1) is weighed.

The head (13) returns taking the first clamp (1) to the perpendicular position (P2) to the filling point (f) in the filling area (10).

The machine, with its microprocessor and relative programs, knows which type of bottle (b1) it is controlling, which will depend on the customer for whom it is to be sent to.

The customer may wish two types of bottle (b1) filling for his product:

a) filling to the brim b) partial filling leaving a height (h) in the bottle neck empty.

Figure 2:
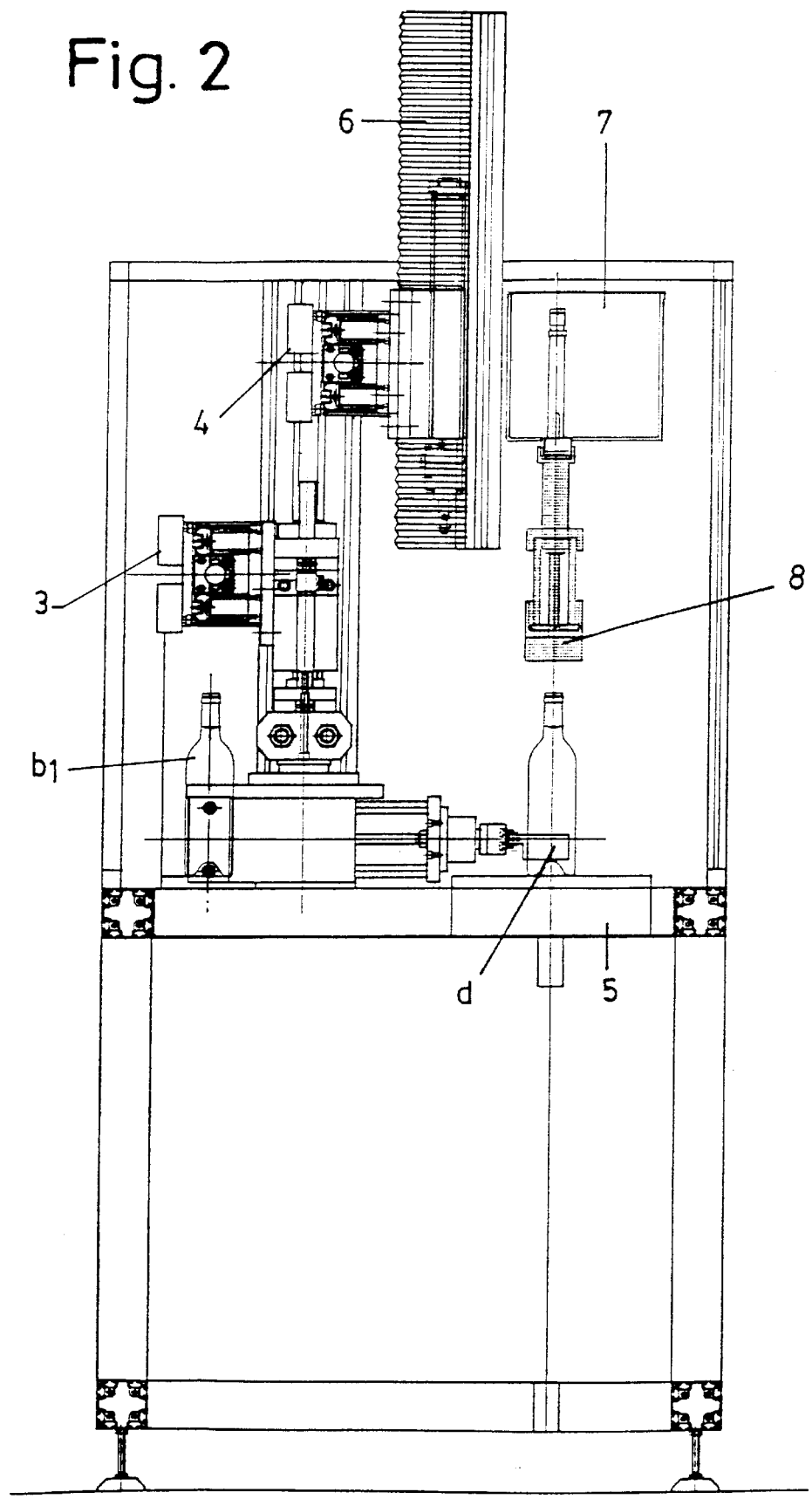
FIG. 2 is a section AA of FIG. 1 but with the system in bottle (b1) filling phase.

The filling unit (7 is arrange or positioned in the vertical of the filling point (f), and by moving the filling head (6) vertically or preferably the filling probe (8), the bottle (b1) (FIGS. 1 and 2) is filled to the brim.

If the filling type is partial filling (b) the levelling unit (9) will come into operation and if it is total filling (a) this will not be used.

In the case of partial filling (b), the element/s, which has descended from the filling unit (7) is/are raised, the filling head (6) is moved horizontally until the levelling unit (9) is placed vertically to the bottle (b1) (position 4) although this may be done the other way round, it being the bottle (b1) which is moved.

Figure 3:
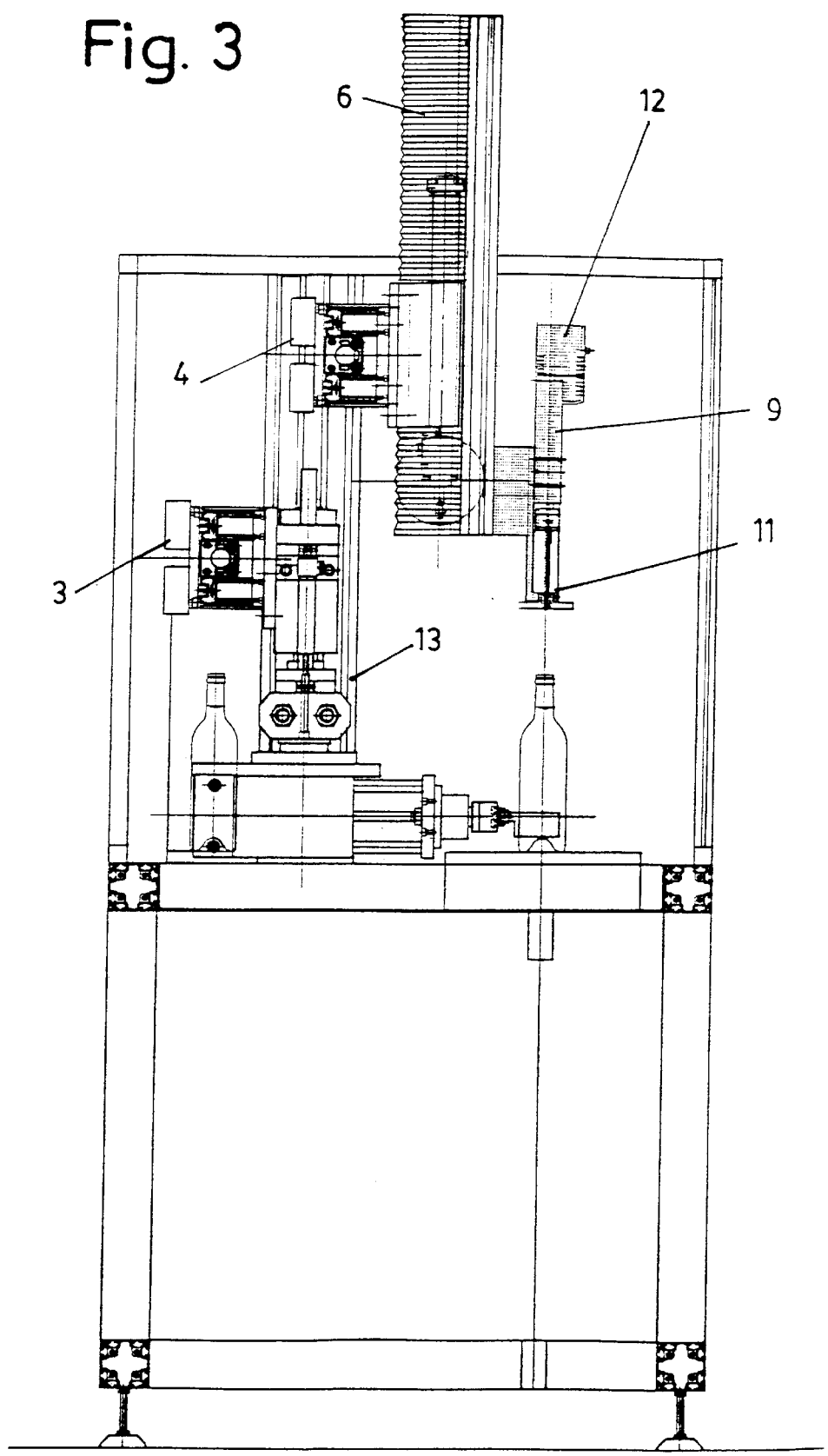
FIG. 3 is a section BB of FIG. 1 but with the system in bottle (b1) liquid levelling phase.

An element of the levelling unit (9) moves vertically until it comes to a stop against the upper surface of the bottle neck (b1) and a precision motor (12) moves the absorption cane (11) a height (h) identical to the height (h) (predetermined amount), which has not been filled in the bottle (b1), and absorbs the relative liquid (FIG. 3).

The cane is raised (11).

After this movement the operation is identical for both types of filling (a), (b).

The first clamp (1) moves the bottle (b1) with the liquid from the filling point (f) to the weighing point (p) where it deposits it and weighs it, thus acquiring the exact detail of the bottle capacity (b1), which was the intention on comparing the weight of the empty bottle with the weight of the full or partially full bottle at a predetermined level.

The first clamp (1) returns to its initial position (P1).

As the first clamp (1) and the second clamp (2) are joined at 90°, we describe the operation of the second clamp (2).

Figure 5:
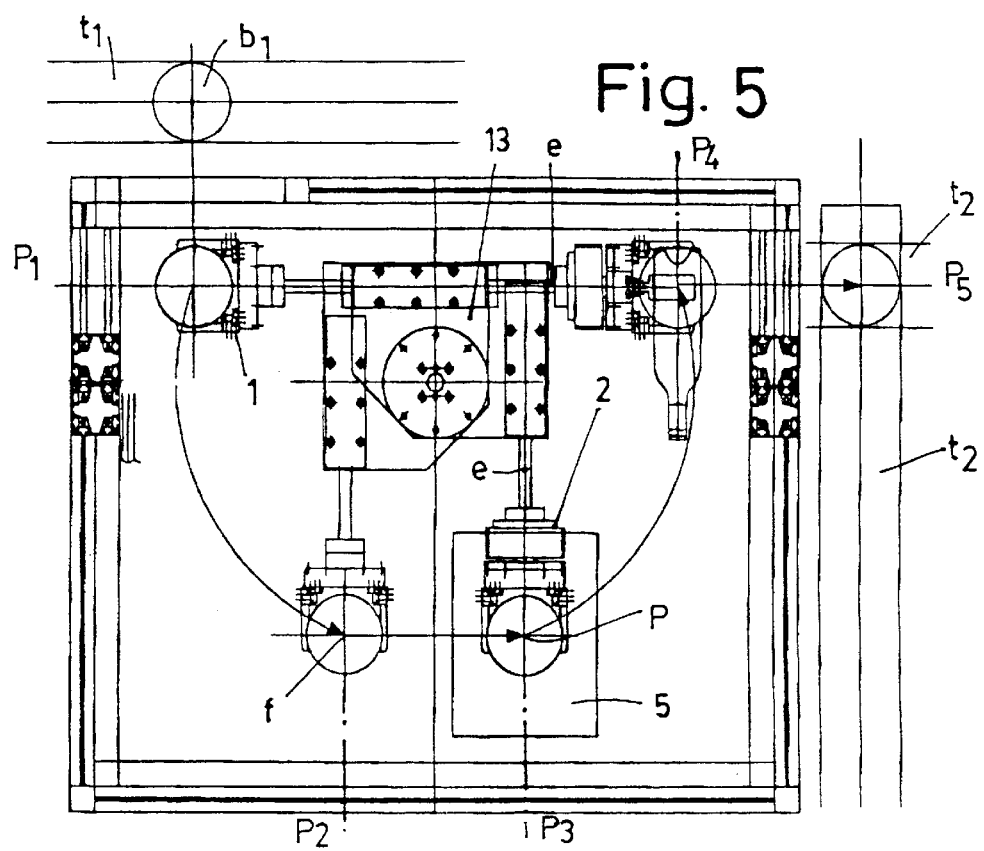
FIG. 5 is a CC sectional view of FIG. 1 with the system in different phases.

When the first clamp (1) is in its initial position (P1), the second clamp (2) is in position (P3) over the scales (5) and picks up the full bottle (b1) which the first clamp (1) has left, it turns on its axis (e), for example 180° and the liquid is poured out until it is empty, whilst the first clamp (1) has picked up a new container and rotates until the perpendicular position (P2), with which the second clamp (2) rotates together with it, which is what FIG. 5 has wished to show with position (P4). The second clamp (2) rotates again on its axis (e) and leaves the bottle (b1) upright.

The first clamp (1) moves towards the weighing (p) and the second clamp (2) to position (P5) to leave the container empty on the output conveyor line (t2).

What is claimed is:

1. Container capacity control system, characterised because it is comprised of:
   a) a first horizontal linear guide (3) where there is a clamp head (13) which can move horizontally and rotate on the horizontal plane, and which bears a first clamp (1) and a second clamp (2) for the input and output of an empty container (b1) respectively;
   b) a second horizontal linear guide (4) where there is a filling head (6), which can at least move horizontally, on this second guide (4) and which bears means for total filling or filling with the predetermined partial amount;
   c) weighing scales (5) which weigh the container (b1) empty and totally full or partially full, sending the weight data to
   d) a microprocessor, which controls the programmed system, so that it distinguishes containers full to the brim and containers filled partially full and which calculates the capacity based on the weight data.

2. Container capacity control system, according to claim 1 wherein the filling means have a total liquid filling unit (7) and a liquid levelling unit (9).

3. Container capacity control system, according to claim 1 wherein the liquid filling unit (7) has a probe (8), which moves vertically and the levelling unit (9) has a suction cane (11), which moves vertically due to the action of a precision motor.

4. Container capacity control system, according to claim 1 wherein because geometrically, on the circumference of the radius of rotation of the first clamp (1), it has a weighing position (p) and a filling position (f), the centre of rotation being at the bisector of the first and second clamps which are joined together.

5. Container capacity control system, according to claim 1 wherein the first clamp (1) and the second clamp (2) have press fingers for the containers and approximation/retracting cylinders, at least one of them being able to rotate on its own axis.

6. Container capacity control system, according to claim 1 wherein because it has an input conveyor line (1) and an output conveyor line (2) for containers.

7. Container capacity control system, according to claim 1 wherein the microprocessor is programmed to control the system and distinguish containers filled to the brim (a) and partially full containers (b) and acting in the system so that:
   a). the first clamp (1) in an initial position (i) picks up a container (b1) from the input conveyor line (1) and takes the empty container (b1) to the weighing position (f) on the weighing scales (5) where it is weighed, and takes it horizontally to a filling position (f);
   b). then the filling probe (8) placed vertically to the container (b1) moves to fill the container to the brim with liquid and if it is a full-to-the-brim container, it is arranged for
   c). the first clamp (1) to return with the container (b1) moving to the weighing position (p) where it deposits it on the scales (5) and weighs it,
   d). the first clamp (1) to return empty to its initial position,
   e). the second clamp (2) to pick up the container (b1), rotating and placing the container upside down, emptying it and rotating again to put it the right way up; and if after the container has been filled to the brim, it is a partially full container, it is arranged previously for
   f). in the levelling unit (9) an absorption cane (11) to move in the container neck (b1) a predetermined amount (h) which absorbs the liquid, and in any case
   g). the second clamp (2) will leave the empty container on the output conveyor line (t2) when the first clamp (1) takes the empty container (b1) to the weighing position (p).

* * * * *

UNITED STATES PATENT AND TRADEMARK OFFICE
CERTIFICATE OF CORRECTION

PATENT NO.    : 6,359,240 B1
DATED         : March 19, 2002
INVENTOR(S)   : Ivo Dutto et al.

It is certified that error appears in the above-identified patent and that said Letters Patent is hereby corrected as shown below:

Column 4,
Line 13, delete "because".

Signed and Sealed this

Fourth Day of June, 2002

Attest:

Attesting Officer

JAMES E. ROGAN
Director of the United States Patent and Trademark Office